(12) United States Patent
Prinz et al.

(10) Patent No.: US 6,692,222 B2
(45) Date of Patent: Feb. 17, 2004

(54) MICRO GAS TURBINE ENGINE WITH ACTIVE TIP CLEARANCE CONTROL

(75) Inventors: Friedrich B. Prinz, Woodside, CA (US); Sangkyun Kang, Palo Alto, CA (US); Tibor Fabian, Menlo Park, CA (US); Georg Brasseur, Vienna (AT); Jordan Tresser, Meriden, CT (US); Francis Holman, Paradise Valley, AZ (US); Hideaki Tsuru, Mountain View, CA (US); Minoru Matsunaga, Tokyo (JP)

(73) Assignees: The Board of Trustees of the Leland Stanford Junior University, Stanford, CA (US); Honda Giken Kogyo Kabushiki Kaisha (JP)

( * ) Notice: Subject to any disclaimer, the term of this patent is extended or adjusted under 35 U.S.C. 154(b) by 0 days.

(21) Appl. No.: 10/173,552

(22) Filed: Jun. 14, 2002

(65) Prior Publication Data

US 2003/0215323 A1 Nov. 20, 2003

Related U.S. Application Data

(60) Provisional application No. 60/378,112, filed on May 14, 2002.

(51) Int. Cl.[7] ............................................. F01D 11/22
(52) U.S. Cl. ....................... 415/14; 415/132; 415/173.2
(58) Field of Search ............................ 415/14, 118, 129, 415/131, 132, 140, 173.1, 173.2

(56) References Cited

U.S. PATENT DOCUMENTS

| | | | |
|---|---|---|---|
| 2,575,710 A | 11/1951 | Hardigg et al. | 73/660 |
| 2,842,738 A | 7/1958 | Warnick et al. | 324/690 |
| 3,058,339 A | 10/1962 | Shapiro | 73/660 |
| 3,467,358 A | 9/1969 | Zablotsky et al. | 415/118 |
| 3,504,279 A | 3/1970 | Foster et al. | 324/662 |
| 3,932,813 A | 1/1976 | Gallant | 123/676 |
| 4,063,167 A | 12/1977 | Duly | 324/671 |
| 4,122,708 A | 10/1978 | Maier | 73/862.326 |
| 4,153,388 A | 5/1979 | Naegeli et al. | 416/61 |
| 4,326,804 A | 4/1982 | Mossey | 356/623 |
| 4,384,819 A | 5/1983 | Baker | 415/14 |
| 4,518,917 A | 5/1985 | Oates et al. | 324/207.25 |
| 4,593,566 A | 6/1986 | Ellis | 73/660 |
| 4,804,905 A | 2/1989 | Ding et al. | 324/662 |
| 4,806,848 A | 2/1989 | Demers | 324/662 |
| 4,813,273 A | 3/1989 | Parsons | 73/118.1 |
| 4,823,071 A | 4/1989 | Ding et al. | 324/662 |
| 4,847,556 A | 7/1989 | Langley | 324/207.18 |
| 4,922,757 A | 5/1990 | Rozelle et al. | 73/660 |
| 4,967,153 A | 10/1990 | Langley | 324/174 |
| 5,065,105 A | 11/1991 | Bruere et al. | 324/662 |
| 5,097,711 A | 3/1992 | Rozelle et al. | 73/660 |
| 5,101,165 A | 3/1992 | Rickards | 324/662 |
| 5,119,036 A | 6/1992 | Rickards et al. | 324/662 |
| 5,140,494 A | 8/1992 | Slade | 361/212 |
| 5,207,054 A | * 5/1993 | Rodgers et al. | 60/804 |
| 5,214,911 A | * 6/1993 | Shekleton | 60/778 |
| 5,263,816 A | * 11/1993 | Weimer et al. | 415/131 |
| 5,723,980 A | 3/1998 | Haase et al. | 324/662 |
| 6,273,671 B1 | 8/2001 | Ress, Jr. | 415/1 |

* cited by examiner

Primary Examiner—Edward K. Look
Assistant Examiner—Richard A Edgar
(74) Attorney, Agent, or Firm—Lumen Intellectual Property Services, Inc.

(57) ABSTRACT

In a micro gas turbine engine, a capacitive sensor is used for measuring a tip clearance of a radial compressor section thereof, and an actuator is used for axially displacing a rotor shaft in response to an output from the capacitive sensor. Because the capacitive change gives an accurate measure of the size of the tip clearance, a particularly high sensitivity can be achieved in parts where the tip clearance is small, thereby providing a highly precise tip clearance control.

48 Claims, 9 Drawing Sheets

MICRO GAS TURBINE ENGINE WITH ACTIVE TIP CLEARANCE CONTROL

CROSS-REFERENCES TO RELATED APPLICATIONS

This application claims the benefit of U.S. Provisional Application No. 60/378,112, filed on May 14, 2002, which is hereby incorporated herein by reference in its entirety.

TECHNICAL FIELD

The present invention relates to a micro gas turbine engine provided with an active tip clearance control.

BACKGROUND OF THE INVENTION

Environmental concerns and increased demands for efficient utilization of available energy resources have prompted the development of various forms of power units. A micro gas turbine engine is one of such power units. Gas turbine engines have been known as a relatively clean and efficient power unit, but their uses have been relatively limited so far because of their size limitations. However, recent development in manufacturing technology has enabled the size of a gas turbine engine to be extremely small.

For instance, by making a rotor shaft incorporated with a compressor wheel and a turbine wheel as an integral ceramic member, it is possible to reduce the length of the gas turbine engine to about 10 cm. When such a micro gas turbine is combined with an alternator or other forms of electric generator, it is possible to replace batteries which have been widely used as small power units but are known to be relatively inefficient, heavy and inconvenient.

Small gas turbine engines are attractive as they can deliver improved power densities with high frequency operation. A major drawback of micro gas turbines is their low efficiency as compared to their large scale counterparts. A key parameter in controlling the efficiency is the clearance between the compressor blades and shroud. It is therefore important to control the tip clearance of the compressor section. Because of manufacturing tolerances and complex modes of thermal expansion of various components, a fixed tip clearance does not allow each particular gas turbine to achieve a satisfactory performance at all times. Therefore, it is desirable to actually measure the tip clearance and utilize the measured tip clearance for the active control of the tip clearance by feedback.

BRIEF SUMMARY OF THE INVENTION

In view of such problems of the prior art, a primary object of the present invention is to provide a micro (miniature) gas turbine engine with an improved tip clearance control.

A second object of the present invention is to provide a micro gas turbine engine with an improved tip clearance control which can operate efficiently under all operating conditions.

A third object of the present invention is to provide a micro gas turbine engine with an improved tip clearance control which can accommodate manufacturing tolerances of component parts and complex modes of thermal expansion of various component parts.

A fourth object of the present invention is to provide a micro gas turbine engine with an improved tip clearance control which is simple in structure and economical to manufacture.

According to the present invention, these and other objects can be accomplished by providing a gas turbine engine with a tip clearance control, comprising: a rotor shaft rotatably supported by a bearing; a compressor wheel integrally joined with the rotor shaft and forming a radial compressor section in cooperation with a surrounding shroud to compress intake air; a combustion chamber for burning fuel by using compressed air produced by the compressor section; a turbine wheel coupled to the rotor shaft and defining a turbine section in cooperation with a surrounding shroud, the turbine section including an inlet end communicating with an outlet of the combustion chamber and an outlet for expelling combustion gas therefrom; a sensor for detecting a tip clearance between the compressor wheel and surrounding shroud; an actuator for selectively causing an axial displacement of the rotor shaft; and a controller for activating the actuator according to an output from the sensor; the sensor comprising a first electrode formed over a surface part of the compressor wheel, and a second electrode formed over a shroud part opposing the first electrode, the controller being adapted to detect a capacitance between the first and second electrodes as a measure of an axial displacement of the rotor shaft.

According to a preferred embodiment of the present invention, the first electrode extends to a surface part of the rotor shaft, the sensor further comprising a third electrode formed over a housing part opposite the extension of the first electrode formed over the rotor shaft, the controller having a first input end connected to the second electrode and a second input end connected to the third electrode.

Because the capacitance is approximately inversely proportional to the size of the tip clearance, a particularly high sensitivity can be achieved in parts where the tip clearance is small, and a highly precise tip control can be achieved. Non-linearity of capacitance as a function of tip clearance can be utilized as an additional signal for tip clearance evaluation to cope with the difficulties in determining absolute capacitance values. The sensor output is given by a serial connection of two capacitors. However, the capacitance between the third electrode and the extension of the first electrode can be made relatively large and relatively invariable with the axial displacement of the rotor shaft so that the capacitor formed by the third electrode and the first electrode extension serves as an electric coupling. Therefore, even though the first electrode is not accessible via a physical lead, it is possible to indirectly detect the capacitance between the first and second electrodes.

Alternatively, a third electrode may be formed over a shroud part adjacent to the second electrode, the controller having a first input end connected to the second electrode and a second input end connected to the third electrode. In this case also, the sensor output is given by a serial connection of two capacitors. The second and third electrodes may be arranged simply one next the other or they may be individually surrounded by guard electrodes to shut off external disturbances or stray capacitance.

Because the profile of the rotor is in most part defined by individual rotor blades, it is important to arrange the second and third electrodes by noting the locations of the rotor blades. For instance, if the second and third electrodes are intended to oppose a common rotor blade, space limitations may create some difficulty in favorably arranging the second and third electrodes on the shroud. Based on such considerations, the second electrode and third electrode may be arranged to be aligned substantially with the edge of one common rotor blade or the second electrode and third electrode may be arranged substantially along a common circumference so as to align with different rotor blades. It would be also possible to offset the second electrode and third electrode from each other both in the axial and circumferential directions so as to oppose different parts of different rotor blades as long as these different parts of the rotor blades pass the two electrodes substantially at the same time.

According to yet another preferred embodiment of the present invention, the sensor comprises a first electrode formed over a surface part of the rotor shaft, a second electrode formed over a housing part opposing the first electrode, a third electrode formed over a housing part opposing the first electrode and adjacent to the second electrode, and a common electrode interposed between the second and third electrodes, the first electrode overlapping only partially with the second and third electrodes so that the electrodes jointly form a differential capacitive assembly, the controller having a pair of differential inputs connected to the second and third electrodes and a common input connected to the common electrode to detect a capacitance between the first and second electrodes as a measure of an axial displacement of the rotor shaft.

Thus, a differential capacitance measurement gives a linear measure of the axial displacement of the rotor shaft or the tip clearance, and this allows a favorable feedback control of the tip clearance by using the actuator.

A capacitance between two electrodes is determined not only by the distance between the two electrodes but also by the dielectric constant of the material interposed between the two electrodes. Therefore, if a pair of electrodes are provided on the side of the shroud, and the compressor blades pass through the electric field formed between the two electrodes, the tip clearance as well as the presence of the blades can be determined as a change in the capacitance between the two electrodes, and no electrode is required to be formed on the compressor blades. To contain the electric field within a prescribed area and avoid external disturbances, the two electrodes may be formed in such a manner that one of them is surrounded by the other.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
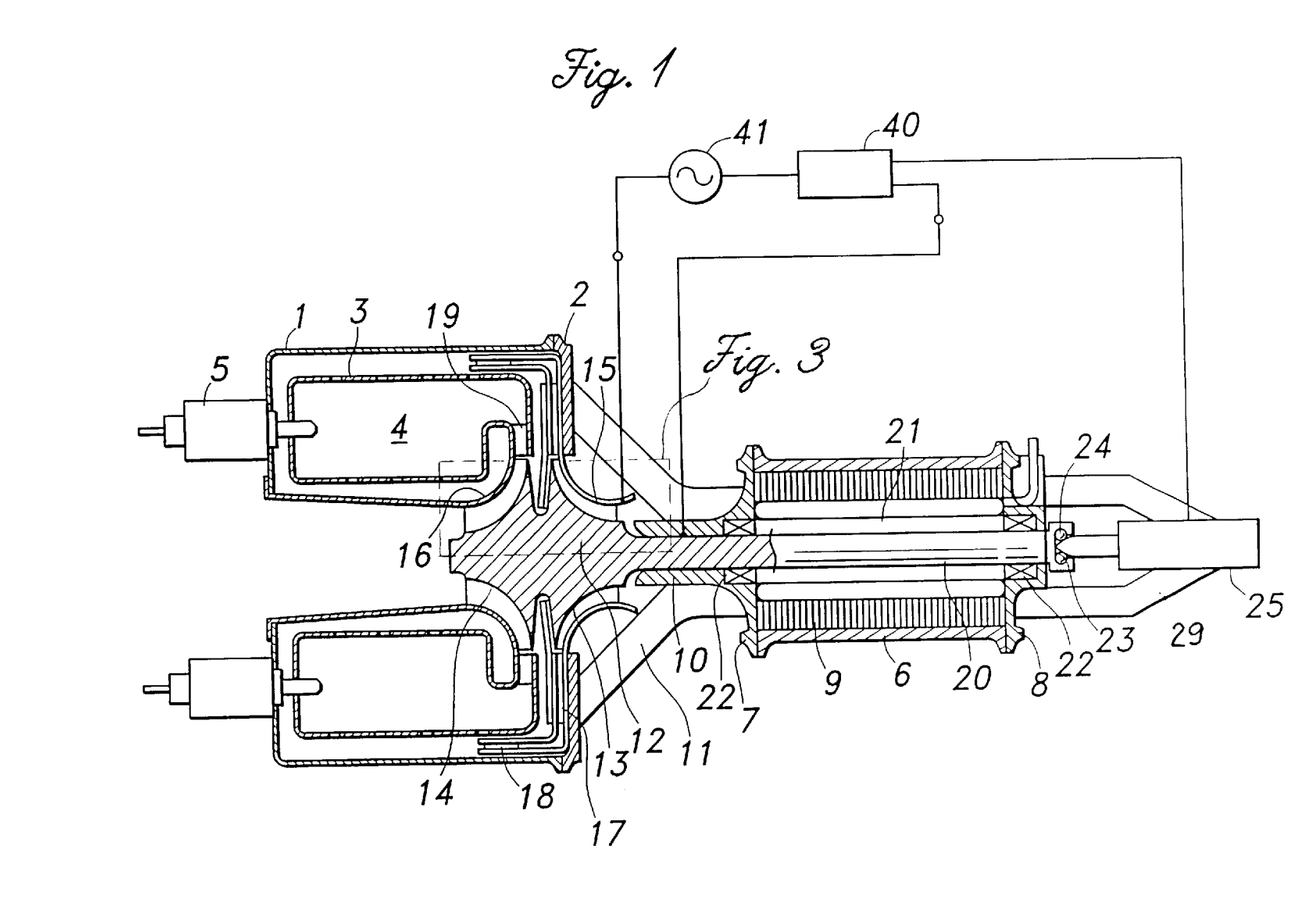
FIG. 1 is a schematic sectional side view of a generator driven by a micro gas turbine engine embodying the present invention.

FIG. 1 shows an electric generator driven by a micro gas turbine engine embodying the present invention. The micro gas turbine engine comprises an annular main housing 1 having an end remote from the generator closed, an end plate 2 attached to the open end of the main housing 1, a perforated annular inner housing 3 coaxially received inside the main housing 1 defining a combustion chamber 4 therein, a plurality of fuel injectors 5 each having a nozzle end projecting into the combustion chamber 4.

The generator comprises a cylindrical main housing 6 and a pair of end plates 7 and 8 respectively attached to either axial end of the main housing 6. The main housing 6 coaxially receives a stator coil 9 therein. The end plate 7 facing the gas turbine engine is provided with a tubular extension 10 extending centrally from the end plate 7 towards the gas turbine engine. The end plate 7 facing the gas turbine engine is joined to the opposite end plate 2 of the gas turbine engine by a plurality of stay members 11.

The gas turbine engine is additionally provided with an integral rotor shaft 12 carrying a compressor wheel 13 and a turbine wheel 14. The compressor wheel 13 and turbine wheel 14 are composed of a plurality of compressor blades and turbine blades, respectively. The integral rotor shaft 12 of this embodiment is made of ceramic material, and is integrally formed or otherwise integrated with the compressor wheel 13 and turbine wheel 14 as a single-piece ceramic rotor unit. Alternatively, the unit may consist of a plurality of individual component parts which are made of a same material or different materials. The material for the turbine blades should be ceramic or other heat resistant material which may be either electroconductive or electrically insulating. The choice of the material or materials depends on the particular configuration and specifications of the gas turbine engine. The axial length of this micro gas turbine engine is approximately 10 cm.

The compressor wheel 13 forms a radial compressor section in cooperation with a shroud 15 formed by a part of the end plate 2 of the gas turbine housing. The inlet end of the compressor section opens out in the axial direction opposite the generator. The outlet end of the compressor section communicates with a gap defined between the main housing 1 and the inner housing 3 via an array of stator vanes 18 and a diffuser 17.

The turbine wheel 14 forms a radial turbine section in cooperation with a turbine casing 16 formed by a part of the main housing 1. The inlet end of the turbine section communicates with an outlet end of the combustion chamber 4 via an inlet nozzle 19. The combustion chamber 4 in this embodiment extends from the inlet end of the turbine section away from the generator. The outlet end of the turbine section opens out in the axial direction facing away from the generator.

The integral rotor shaft 12 further comprises a generator shaft 20 which is an integral extension of the rotor shaft 12, and is passed centrally through the generator. Permanent magnet pieces 21 are mounted to or otherwise integrated in the generator shaft 20 to form the main functional part of the generator in cooperation with the stator coil 9. A roller bearing 22 is provided in each end plate to support the integral rotor shaft 12 at two points. The bearings 22 may also consist of air bearings that can favorably accommodate the axial displacement of the generator shaft 20 as described hereinafter. As can be readily appreciated, the types of the bearings and generator can be selected from any known ones without departing from the spirit of the present invention.

An axial end of the generator shaft 20 projecting out of the end plate 8 of the generator remote from the gas turbine engine is formed with a recess 23 receiving a plurality of steel balls 24, and a tapered end of an axial actuator 25 abuts the recessed axial end of the generator shaft 20 via the steel balls 24. The actuator 25 may be fixedly attached to the main housing 6 with a suitable stay member such as stay member 29. The actuator 25 consists of a piezo actuator in this embodiment, but may consist of an electromagnetic or other actuator as long as it is provided with a required response property.

A piezo actuator offers a number of benefits and advantages over other motion techniques. A piezo actuator can achieve a repeatable nanometer and sub-nanometer sized steps at high frequency because its motion is based on solid state crystal effects. A piezo actuator can be designed to move heavy loads (several tons) or can be made to move light loads at frequencies of several 10 kHz. A piezo actuator acts as a capacitive load and requires very little power in static operation, and this simplifies the power supply needs. A piezo actuator requires no maintenance because it is solid state, and its motion is based on molecular effects within ferroelectric crystals.

Figure 2:
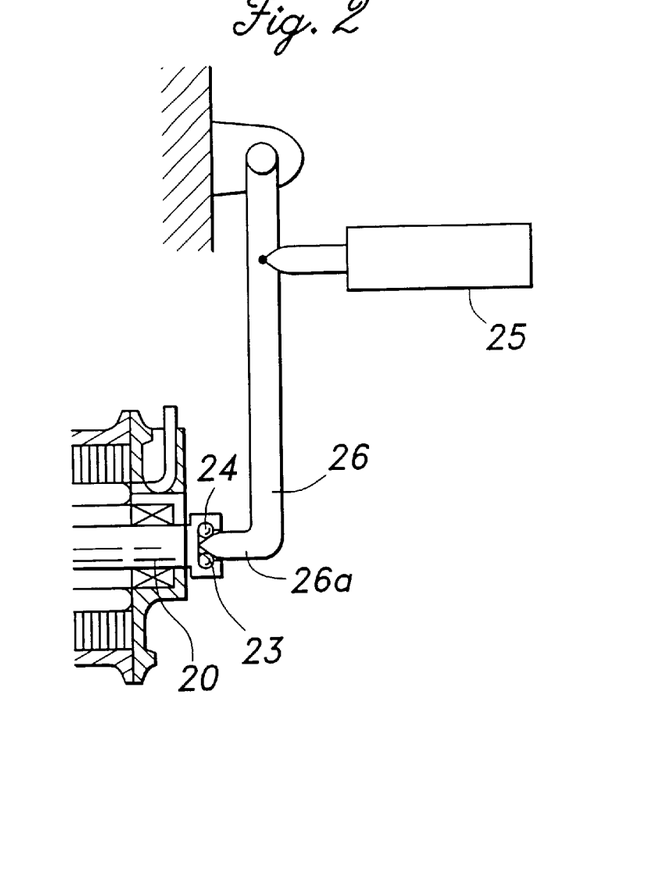
FIG. 2 is a fragmentary side view of the working end of the actuator.

One of the disadvantages of a piezo actuator is its low strain in the order of 0.1%. This means that 100 mm long piezo actuator can expand by 100 micrometers when the maximum allowable field is applied. Simple distance transducers such as a lever can magnify the displacement but at the same time attenuate the transmitted force by the same ratio. A piezo actuator can develop forces much larger than the axial forces occurring at the rotor shaft of the gas turbine engine. Therefore, a distance transducer could be used to shorten the required length of the piezo actuator. FIG. 2 schematically illustrates a lever member 26 interposed between the axial end of the generator shaft 20 and actuator 25. The base end of the lever member 26 is pivotally attached to a fixed point of the assembly and the free end 26a of the lever member 26 is provided with a tapered end which abuts a recess 23 formed at the axial end of the generator shaft 20 via steel balls 24.

Figure 3:
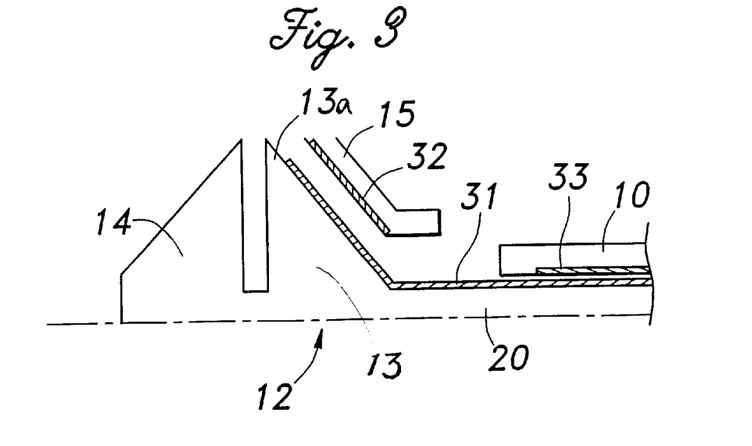
FIG. 3 is a simplified diagram schematically illustrating a capacitive sensor shown in a dashed area in FIG. 1 according to the present invention.

FIG. 3 schematically illustrates the principle of the tip clearance measurement employed in this embodiment which is based on the measurement of capacitance and/or its change with tip clearance. The shroud and other parts of the housings are made of electrically conductive metallic material, but the integral rotor shaft 12 is made of electrically non-conductive ceramic material. Also, it is extremely difficult to feed or draw electric current into or out of the integral rotor shaft 12 because it rotates at high speed in operation. Therefore, in this embodiment, at least the outer surface of the compressor wheel 13 and a part of the generator shaft 20 received in the tubular extension 10 of the generator end plate 7 are subjected to a suitable surface modification which makes the surface of the integral rotor shaft 12 electrically conductive for the purpose of forming capacitors in cooperation with the shroud 15 and tubular extension 10. More specifically, the surface of the blades 13a of the compressor wheel 13 is formed with a first electrode 31 which includes an extension covering a surface part of the generator shaft 20, and a second and third electrode 32 and 33 are formed on the opposing surfaces of the shroud 15 and the tubular extension 10, respectively. As can be readily appreciated, the shroud 15 and the tubular extension 10 should be electrically insulated from each other. If desired, the compressor wheel 13 may be made of electrically conductive material or a combination of metallic material and electrically insulating material as long as the necessary insulation is ensured or the compressor wheel 13 is allowed to be in the grounded state for the disclosed measurement techniques.

In this embodiment, the rotor shaft 12 is entirely made of ceramic material, but may also consist of a combination of metallic material and electrically insulating material as long as a required electric insulation is effected for the first electrode 31 by suitable means.

A serial connection of an AC voltage source 41 and a controller 40 including a measuring circuit is connected between the two electrodes 32 and 33 respectively formed on the shroud 15 and tubular extension 10. If the capacitance between the shroud electrode 32 and rotor electrode 31 is C1 and the capacitance between the rotor electrode 31 and tubular extension electrode 33 is C2, the combined capacitance as seen from the controller 40 is C1C2/(C1+C2). C2 is relatively fixed during the operation of the gas turbine engine, and significantly larger than C1 because the area of the electrodes forming C2 is substantially larger than that forming C1. Therefore, the combined capacitance can be safely approximated by C1. Also, C1 is related to the clearance between the blades 13a of the compressor wheel 13 and associated shroud 15 in an approximately inversely proportional manner. This relationship between C1 and the tip clearance is somewhat nonlinear, and applicants have found that an accurate measure of the tip clearance can be determined therewith. In particular, the capacitance C1 gives a highly sensitive measure of the clearance as the clearance gets smaller and in parts where the clearance is small. Note FIG. 3 is a simplified enlargement of the dashed area shown in FIG. 1. FIG. 3 is intentionally drawn with exaggerated (wider) gap for illustrative purposes only. As is apparent to one skilled in the art, drawings disclosed herein are not to scale and are not to be construed as limiting the present invention whatsoever.

Figure 4:
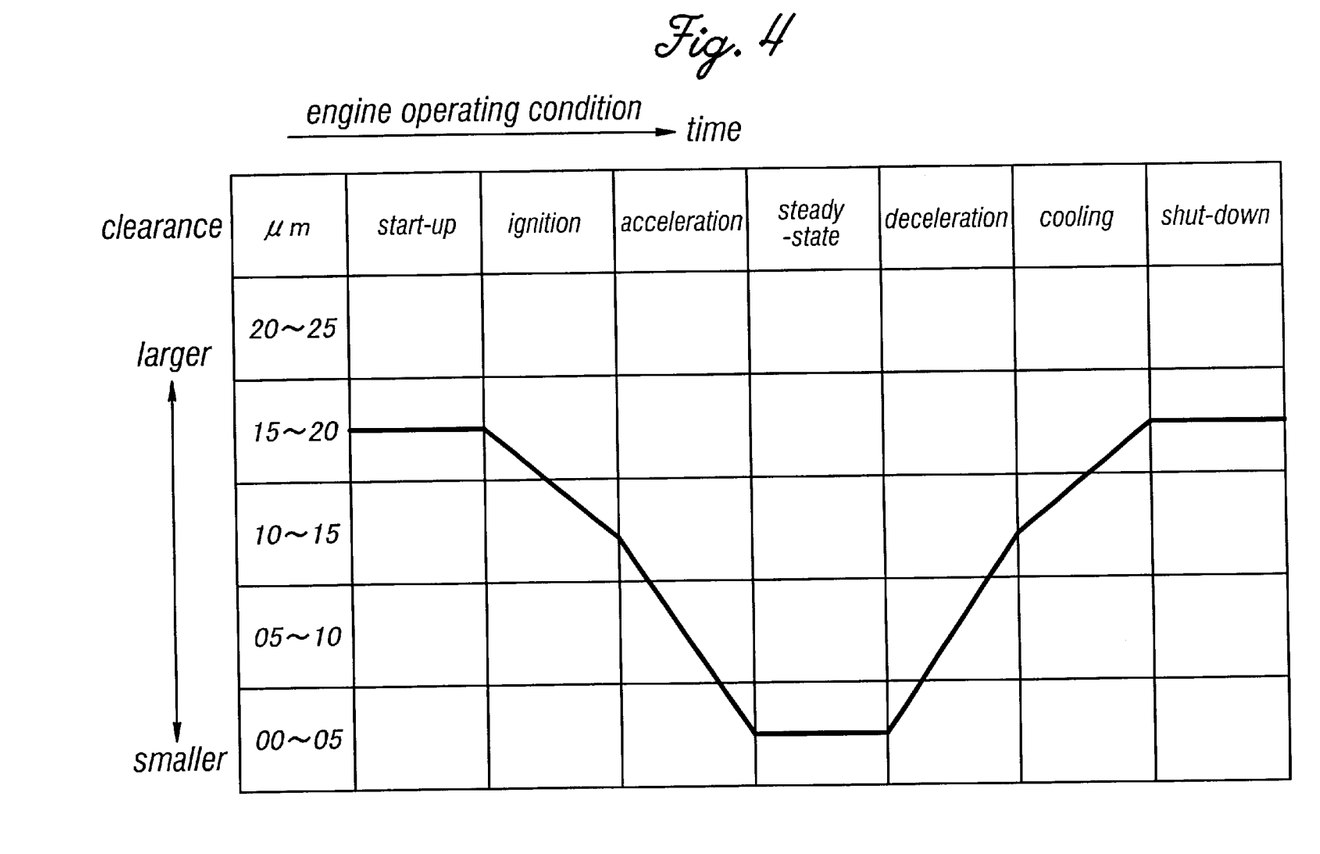
FIG. 4 is a typical time history of an ideal tip clearance.

The mode of operation of this embodiment is described in the following with reference to FIGS. 4 and 5. FIG. 4 shows an ideal time history of the tip clearance from the start-up to shut-down of the gas turbine engine. Initially, the tip clearance is relatively large, but progressively diminishes to a minimum value by the time a steady-state operation is reached. When the gas turbine engine is about to be shut down, the tip clearance is gradually increased. Changes in the load and other external disturbances prevent the ideal tip clearance to be maintained.

Figure 5:
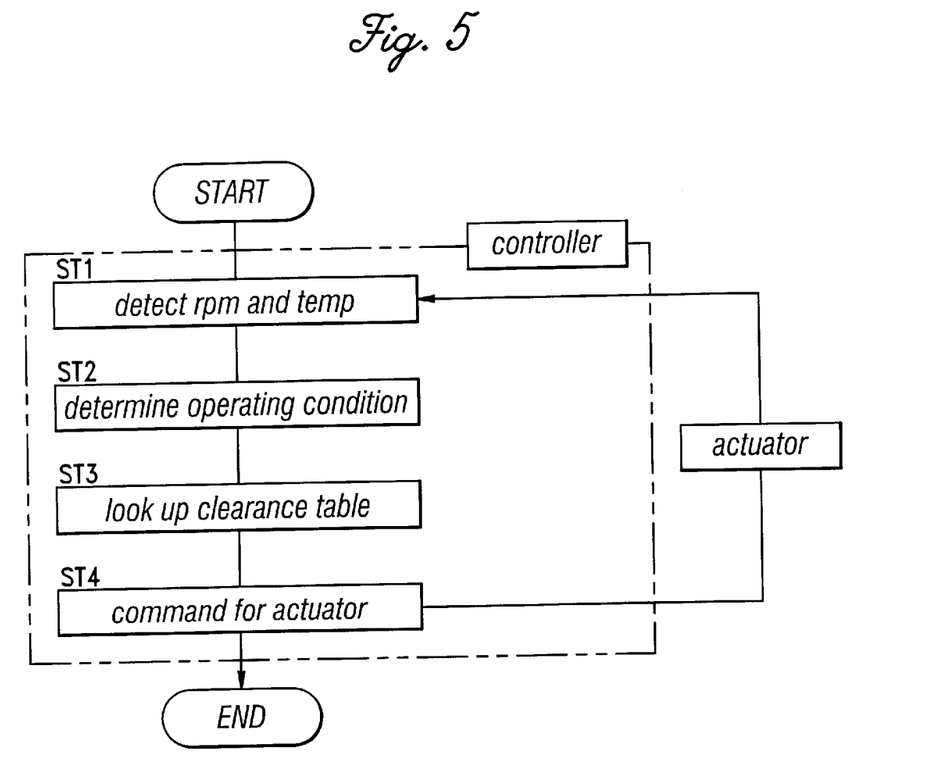
FIG. 5 is a flow chart of the control process performed by the controller of the present invention.

FIG. 5 shows the flow chart of the control process for this micro gas turbine engine. First of all, the rotational speed of the engine and a representative temperature of the engine are measured (step ST1). It is determined from the measured rotational speed and temperature what is the current mode of operation, such as such as the start-up, ignition, acceleration, steady-state, deceleration, cooling or shut-down (step ST2). By looking up a clearance table, the ideal tip clearance is determined (step ST3). The controller then provides an appropriate command to the actuator to change the current tip clearance to the ideal tip clearance (step ST4).

System efficiency may be further improved by using the electrical output as an additional means in control loop to determine the best tip clearance. This can be done by using a state-of-the-art control theory by measuring electrical output as a function of control in tip clearance.

Figure 6:
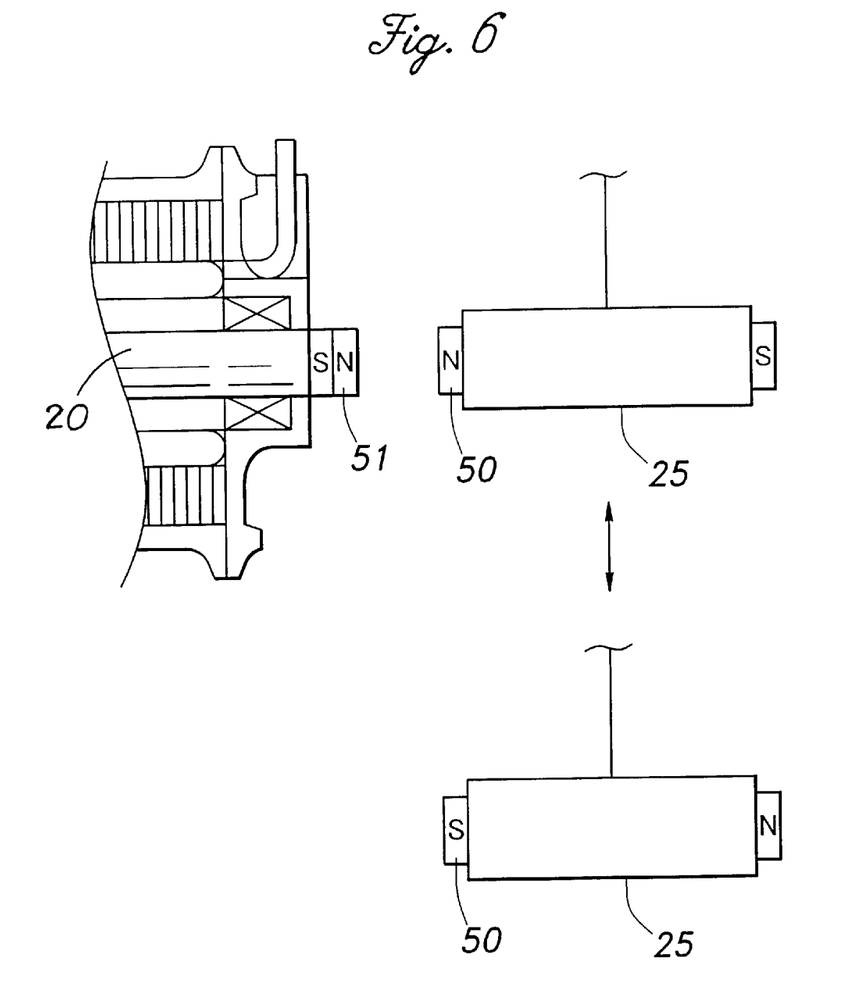
FIG. 6 is another embodiment of the coupling between the working end of the actuator and the rotor shaft.

FIG. 6 shows a magnetic coupling that can be placed between the working end of the actuator and the shaft end, instead of the rotational coupling shown in FIG. 1. This magnetic coupling comprises a permanent magnet piece 51 attached to an axial end of the generator shaft 20 and an electromagnetic piece 50 provided in the working end of the actuator 25. By suitably controlling the magnetic polarity of the electromagnetic piece 50, and selectively producing a repulsive and attractive force between the actuator 25 and the generator shaft 20, a desired axial pressure can be applied to the rotor shaft without touching the generator shaft 20.

Figure 7:
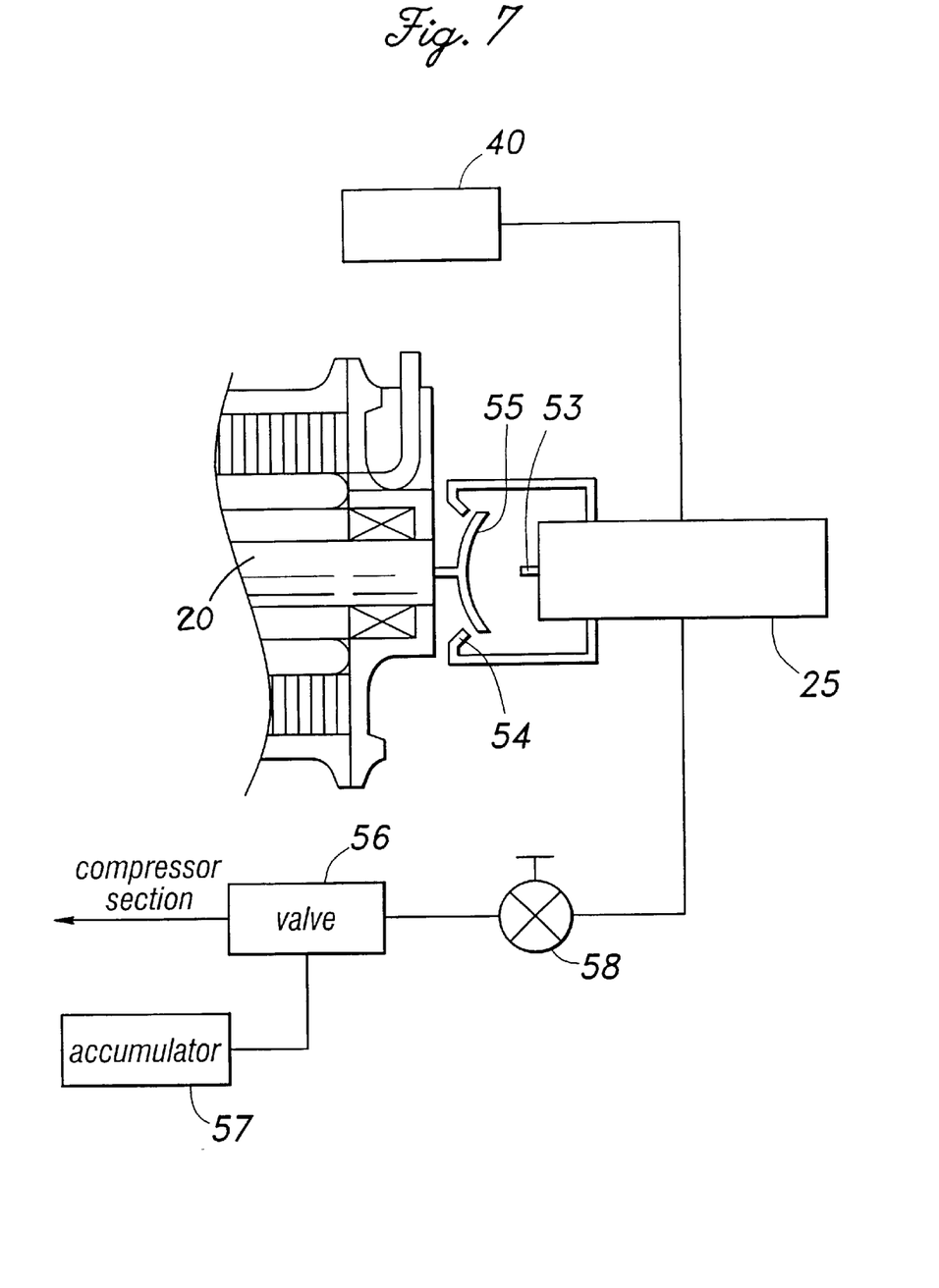
FIG. 7 is yet another embodiment of the coupling between the working end of the actuator and the rotor shaft.

FIG. 7 shows a flapper nozzle coupling that can be placed between the working end of the actuator and the shaft end, instead of the rotational coupling shown in FIG. 1. The actuator 25 includes two sets of flapper nozzles 53 and 54 directed in opposite directions, and a flapper piece 55 extends from an end of the generator shaft 20 so that the air flows issuing from the two sets of flapper nozzles 53 and 54 may be impinged upon the flapper piece 55 in either axial direction. The air flows can be obtained by drawing a part of the compressed air from the outlet end of the compressor section. An accumulator 57 may be provided in association with the actuator to accumulate the compressed air during the operation of the engine, and supply the compressed air when the engine is not in operation. To this end, a switch valve 56 may be used in addition to a shut off valve 58.

Figure 8:
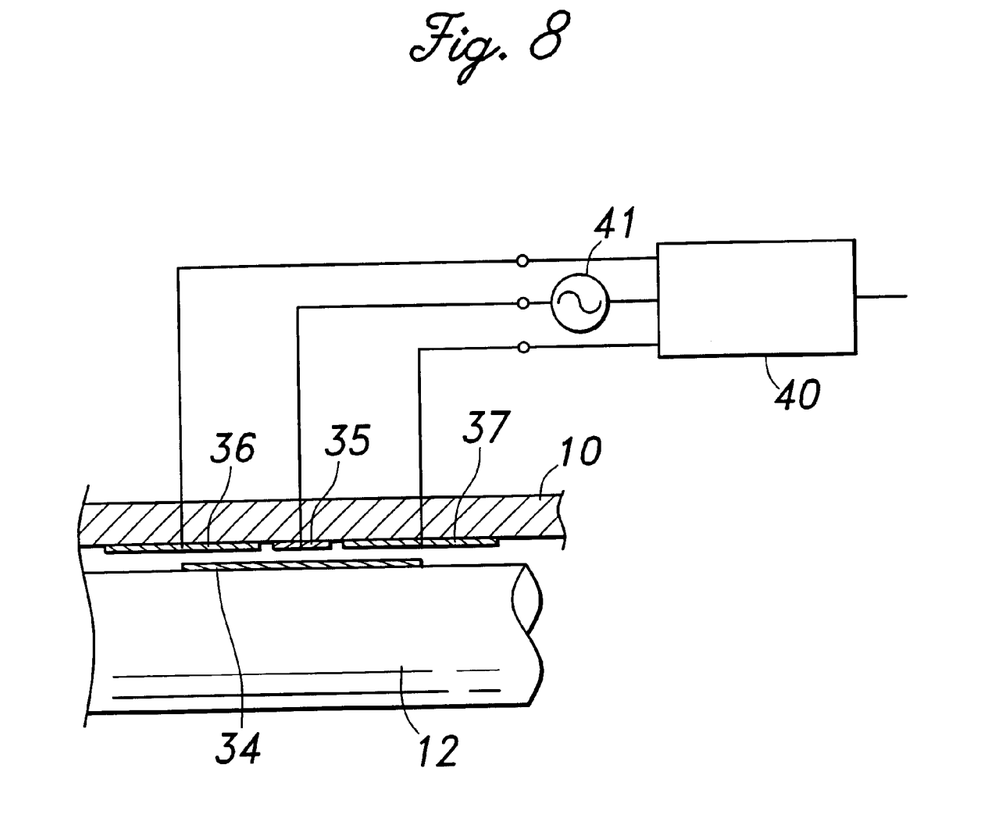
FIG. 8 is a view similar to FIG. 3 illustrating a second embodiment of capacitive sensor according to the present invention.

FIG. 8 shows a second embodiment of the capacitive sensor for tip clearance control. This embodiment allows the axial displacement of the rotor shaft 12 to be measured, instead of directly measuring the tip clearance. This, as well as other embodiments of the present invention, requires a certain calibration to determine the relationship between the actual tip clearance and the sensor output.

In this embodiment, a first electrode 34 is formed on the outer circumferential surface of the integral rotor shaft 12 which is preferably made of ceramic material but may consist of a metallic member having an electrically insulated part at least on a surface part thereof. The opposing inner surface of the tubular extension 10 of the generator end plate 7 is provided with a common electrode 35 consisting of a relatively narrow strip formed over the inner circumferential surface of the tubular extension 10 at an axial position opposing an axially central part of the first electrode 34, and a second electrode 36 and a third electrode 37 which axially adjoin or otherwise respectively positioned substantially near the common electrode 35 on either side thereof and each respectively extends slightly beyond the corresponding far end of the first electrode 34. Preferably, these electrodes all extend over the entire circumference.

As is apparent to one skilled in the art, if the capacitance between one of the second and third electrodes 36 and the first electrode 34 is Ca and the capacitance between the other of the second and third electrodes 37 and the first electrode 34 is Cb, the relative axial displacement dx between the rotor shaft 12 and tubular extension 10 can be given by:

$$dx/L = (Ca - Cb)/(Ca + Cb)$$

where L is the axial length of the first electrode 34.

To measure the capacitances Ca and Cb, the common electrode 35 is needed because a direct electrical connection to the first electrode 34 is not possible, and the rotor shaft 12 rotates at high speed. The common electrode 35 is required to be designed in such a way that the capacitance between the common electrode 35 and first electrode 34 will be independent from the relative axial displacement. The controller 40 in this case is provided with a common input which is connected to the common electrode 35 and a pair of differential inputs which are connected to the second and third electrodes 36 and 37, respectively.

According to this embodiment, because the capacitive sensor can be provided in a terminal end part of the compressor section or a part adjacent to the compressor section, as opposed to the main part of the compressor section, the overall arrangement can be formed as a highly compact unit. Also, the second and third electrodes 36 and 37 as well as the common electrode 35 are accessible from the other side of the tubular extension 10 so that the wiring for the capacitive sensor can be highly simplified.

Figure 9:
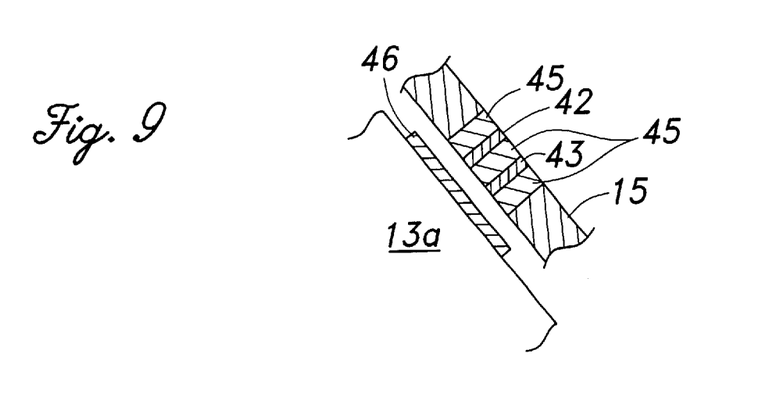
FIG. 9 is a simplified sectional view illustrating a third embodiment of capacitive sensor according to the present invention.

FIG. 9 shows a third embodiment of the capacitive sensor for tip clearance control, and the parts corresponding to those of the previous embodiments are denoted with like numerals. In this embodiment, a first electrode 46 is formed on the outer circumferential surface of the blades 13a of the compressor wheel 13. A second and third electrode 42 and 43 are formed on the opposing surfaces of the shroud 15. A slot or a rectangular opening is formed through the shroud 15, and is filled with an insulating member 45. The second and third electrode 42 and 43 consist of rod members which extend across the thickness of the insulating member 45 in a parallel relationship. The second and third electrodes 42 and 43 are connected to the two input terminals of the controller 40.

In this embodiment, the second and third electrodes 42 and 43 are arranged to be aligned substantially with the edge of one common rotor blade 13a at different radial distances from the shaft. In this case, either the common rotor blade 13a is made of an insulating material and coated with an electrically conductive layer, or the compressor wheel 13 is simply made of electrically conductive material.

Figure 10:
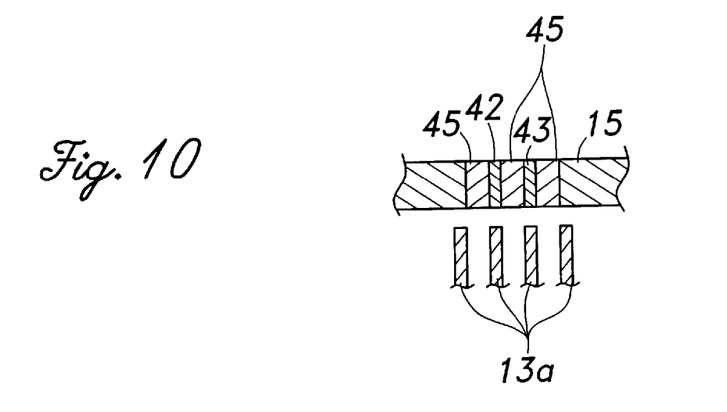
FIG. 10 is a view similar to FIG. 9 showing a fourth embodiment of the present invention.

Alternatively, as illustrated in FIG. 10, the second and third electrodes 42 and 43 may be arranged along a common circumference so as to align with two different blades 13a in an identical manner (the fourth embodiment). In this case also, either the common rotor blade 13a is made of an insulating material and coated with an electrically conductive layer, or the compressor wheel 13 is simply made of electrically conductive material.

According to the embodiments illustrated in FIGS. 9 and 10, because the second and third electrodes 42 and 43 on the shroud side are located so as to correspond to the blade or blades 13a of the compressor wheel 13, the two electrodes 42 and 43 may be placed relatively away from each other without compromising the sensitivity. This contributes to the reduction in stray capacity and improves the freedom in selecting the positions of the electrodes.

Figure 11:
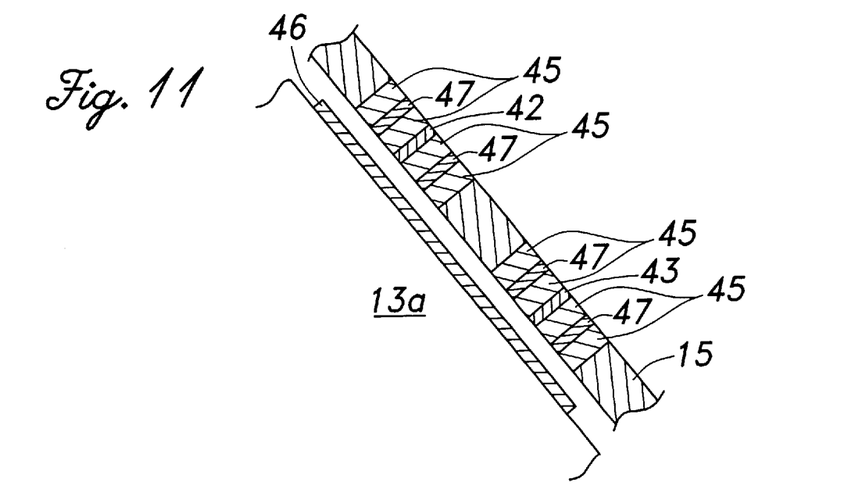
FIG. 11 is a view similar to FIG. 9 showing a fifth embodiment of the present invention.

Depending on the application, guard electrodes may be used to shut off external disturbances. FIG. 11 shows such an embodiment (the fifth embodiment), which is similar to the embodiment illustrated in FIG. 9, and the parts corresponding to those shown in FIG. 9 are denoted with like numerals without repeating the description of such parts. Each of the second and third electrodes 42 and 43 are surrounded by tubular guard electrodes 47 which extends across the thickness of the insulating member 45 coaxially with respect to the second or third electrode 42 or 43 as the case may be.

In this embodiment, the second and third electrodes 42 and 43 are arranged in two separate openings formed in the shroud, but it is also possible to form a single opening and arrange the second and third electrodes in the same opening as long as proper insulation is ensured.

Figure 12:
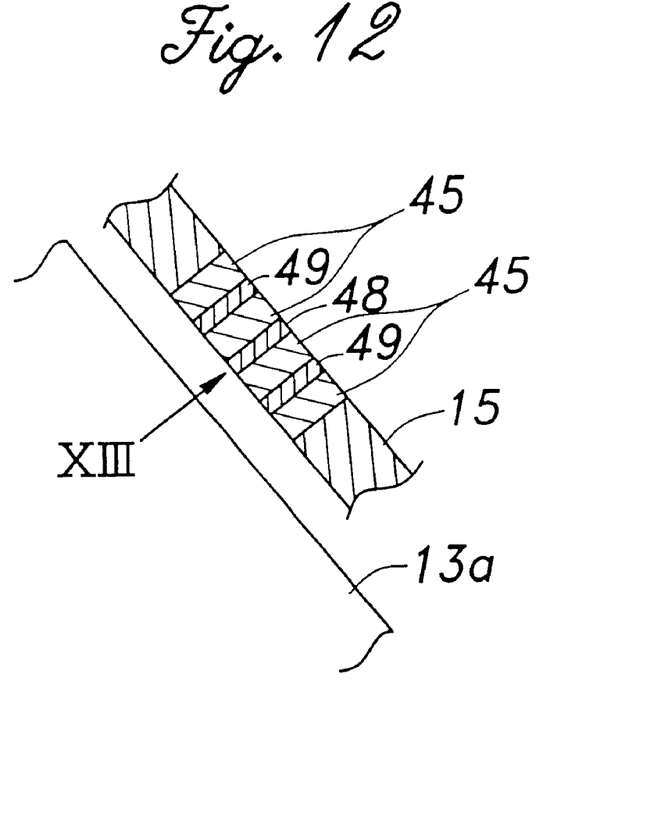
FIG. 12 is a view similar to FIG. 9 showing a sixth embodiment of the present invention.
Figure 13:
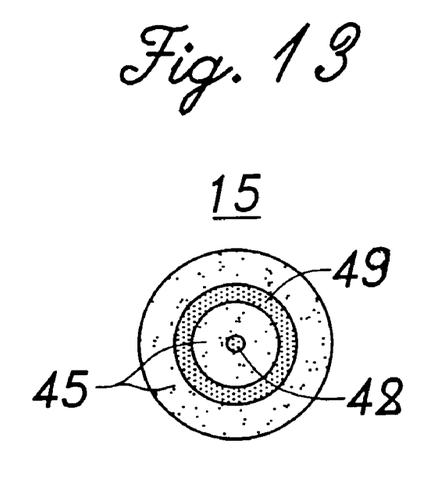
FIG. 13 is an end view as seen in the direction of arrow XIII shown in FIG. 12.

FIGS. 12 and 13 show a sixth embodiment of the capacitive sensor for tip clearance control. This embodiment allows the tip clearance to be measured directly. In this embodiment, a pair of electrodes 48 and 49 are formed in a part of the shroud 15 opposing the blades 13a of the compressor wheel 13. A circular opening is formed through the shroud 15, and this opening is filled with an insulating member 45. The first electrode 48 consists of a rod member which extends centrally across the thickness of the insulating member 45, and the second electrode 49 consists of a tubular member which extends across the thickness of the insulating member 45 coaxially around the first electrode 48. The first and second electrodes 48 and 49 are respectively connected to the two input terminals of the controller 40 in a similar manner as the first embodiment.

In this case, the blades 13a of the compressor wheel 13 are not required to be provided with an electrode, and may be made of either electrically conductive or insulating material. As the blades 13a pass the two electrodes, they come into the electric field formed between the two electrodes. The blades 13a normally have a dielectric constant which is different from that of air. Therefore, the capacitance between the two electrodes 48 and 49 changes as the blades 13a pass the two electrodes, and the magnitude of this change gives a measure of the tip clearance.

Although the present invention has been described in terms of preferred embodiments thereof, it is obvious to a person skilled in the art that various alterations and modifications are possible without departing from the scope of the present invention which is set forth in the appended claims.

What is claimed is:

1. A gas turbine engine with an active tip clearance control, comprising:
    a rotor shaft rotatably supported by a bearing;
    a compressor wheel integrally joined with said rotor shaft and forming a radial compressor section in cooperation with a first surrounding shroud to compress intake air;
    a combustion chamber for burning fuel with compressed air produced by said compressor section;
    a turbine wheel coupled to said rotor shaft and defining a turbine section in cooperation with a second surrounding shroud, said turbine section including an inlet end communicating with an outlet of said combustion chamber and an outlet for expelling combustion gas therefrom;
    a sensor for detecting a tip clearance between the compressor wheel and said first surrounding shroud, wherein said sensor comprises
        a first electrode formed over a surface part of said compressor wheel, wherein said first electrode extends to a surface part of said rotor shaft,
        a second electrode formed over a shroud part opposing said first electrode, and
        a third electrode formed over a housing part opposing said extension of said first electrode formed over said surface part of said rotor shaft;
    an actuator for selectively causing an axial displacement of said rotor shaft; and
    a controller operatively coupled to said sensor and said actuator for controlling said tip clearance by selectively activating said actuator to cause said axial displacement according to an output from said sensor, said controller having a first terminal operatively coupled to said second electrode and a second terminal operatively coupled to said third electrode.

2. The gas turbine engine according to claim 1, wherein a working end of said actuator engages said rotor shaft via a lever mechanism.

3. The gas turbine engine according to claim 1, wherein said actuator comprises a piezo actuator.

4. The gas turbine engine according to claim 1, wherein a working end of said actuator engages said rotor shaft via a rotational coupling.

5. The gas turbine engine according to claim 1, wherein a working end of said actuator engages said rotor shaft via a magnetic coupling.

6. The gas turbine engine according to claim 1, wherein said actuator comprises a flapper nozzle adapted to impinge an air flow onto an end of said rotor shaft.

7. The gas turbine engine according to claim 1, wherein said rotor shaft is integrated with said turbine wheel and said compressor wheel as a single-piece unit.

8. The gas turbine engine according to claim 7, wherein said single-piece unit is made of ceramic material.

9. The gas turbine engine according to claim 1, wherein said rotor shaft is integrated with said turbine wheel or said compressor wheel as a single-piece unit.

10. The gas turbine engine according to claim 1, wherein said controller is adapted to control said tip clearance according to a feedback mechanism.

11. The gas turbine engine with a tip clearance control according to claim 10, wherein said controller is adapted to control said tip clearance according to a prescribed schedule.

12. A gas turbine engine with an active tip clearance control, comprising:
    a rotor shaft rotatable supported by a bearing;
    a compressor wheel integrally joined with said rotor shaft and forming a radial compressor section in cooperation with a first surrounding shroud to compress intake air;
    a combustion chamber for burning fuel with compressed air produced by said compressor section;
    a turbine wheel coupled to said rotor shaft and defining a turbine section in cooperation with a second surrounding shroud, said turbine section including an inlet end communicating with an outlet of said combustion chamber and an outlet for expelling combustion gas therefrom;
    a sensor for detecting a tip clearance between the compressor wheel and said first surrounding shroud, wherein said sensor comprises
        a first electrode formed over a surface part of said compressor wheel,
        a second electrode formed over a shroud part opposing said first electrode, and
        a third electrode formed opposing said first electrode and adjacent to said second electrodes;
    an actuator for selectively causing an axial displacement of said rotor shaft; and
    a controller operatively coupled to said sensor and said actuator for controlling said tip clearance by selectively activating said actuator to cause said axial displacement according to an output from said sensor, said controller having a first input terminal operatively coupled to said second electrode and a second input terminal operatively coupled to said third electrode.

13. The gas turbine engine according to claim 12, wherein said actuator comprises a piezo actuator.

14. The gas turbine engine according to claim 12, wherein a working end of said actuator engages said rotor shaft via a lever mechanism.

15. The gas turbine engine according to claim 12, wherein a working end of said actuator engages said rotor shaft via a rotational coupling.

16. The gas turbine engine according to claim 12 wherein a working end of said actuator engages said rotor shaft via a magnetic coupling.

17. The gas turbine engine according to claim 12, wherein said actuator comprises a flapper nozzle adapted to impinge an air flow onto an end of said rotor shaft.

18. The gas turbine engine according to claim 12, wherein said rotor shaft is integrated with said turbine wheel and said compressor wheel as a single-piece unit.

19. The gas turbine engine according to claim 18, wherein said single-piece unit is made of ceramic material.

20. The gas turbine engine according to claim 12, wherein said rotor shaft is integrated with said turbine wheel or said compressor wheel as a single-piece unit.

21. The gas turbine engine according to claim 12, wherein said controller is adapted to control said tip clearance according to a feedback mechanism.

22. The gas turbine engine with a tip clearance control according to claim 21, wherein said controller is adapted to control said tip clearance according to a prescribed schedule.

23. The gas turbine engine according to claim 12, wherein said second electrode and said third electrode are arranged to be aligned substantially with the edge of one common rotor blade.

24. The gas turbine engine according to claim 12, wherein said second electrode and third electrode are arranged substantially along a common circumference so as to align with different rotor blades.

25. The gas turbine engine according to claim 12, wherein at least one of said second and third electrodes is surrounded by a substantially annular guard electrode.

26. A gas turbine engine with an active tip clearance control, comprising:
 a rotor shaft rotatably supported by a bearing;
 a compressor wheel integrally joined with said rotor shaft and forming a radial compressor section in cooperation with a first surrounding shroud to compress intake air;
 a combustion chamber for burning fuel with compressed air produced by said compressor section;
 a turbine wheel coupled to said rotor shaft and defining a turbine section in cooperation with a second surrounding shroud, said turbine section including an inlet end communicating with an outlet of said combustion chamber and an outlet for expelling combustion gas therefrom;
 a housing surrounding a part of said rotor shaft;
 a sensor for detecting a tip clearance between the compressor wheel and said first surrounding shroud;
 an actuator for selectively causing an axial displacement of said rotor shaft; and
 a controller operatively coupled to said sensor and said actuator for controlling said tip clearance by activating said actuator according to an output from said sensor;
 said sensor comprising a first electrode formed over a surface part of said rotor shaft, a second electrode formed over a housing part opposing said first electrode, a third electrode formed over a housing part opposing said first electrode and adjacent to said second electrode, and a common electrode interposed between said second and third electrodes, said first electrode overlapping only partially with said second and third electrodes so that said electrodes jointly form a differential capacitive assembly, said controller having a pair of differential terminals operatively coupled to said second and third electrodes and a common terminal operatively coupled to said common electrode to detect a capacitance between said first and second electrodes so to determine said axial displacement of said rotor shaft.

27. The gas turbine engine according to claim 26, wherein said actuator comprises a piezo actuator.

28. The gas turbine engine according to claim 26, wherein a working end of said actuator engages said rotor shaft via a lever mechanism.

29. The gas turbine engine according to claim 26, wherein a working end of said actuator engages said rotor shaft via a rotational coupling.

30. The gas turbine engine according to claim 26, wherein a working end of said actuator engages said rotor shaft via a magnetic coupling.

31. The gas turbine engine according to claim 26, wherein said actuator comprises a flapper nozzle adapted to impinge an air flow onto an end of said rotor shaft.

32. The gas turbine engine according to claim 26, wherein said rotor shaft is integrated with said turbine wheel and said compressor wheel as a single-piece unit.

33. The gas turbine engine according to claim 32, wherein said single-piece unit is made of ceramic material.

34. The gas turbine engine according to claim 26, wherein said rotor shaft is integrated with said turbine wheel or said compressor wheel as a single-piece unit.

35. The gas turbine engine according to claim 26, wherein said controller is adapted to control said tip clearance according to a feedback mechanism.

36. The gas turbine engine with a tip clearance control according to claim 35, wherein said controller is adapted to control said tip clearance according to a prescribed schedule.

37. A gas turbine engine with a tip clearance control, comprising:
 a rotor shaft rotatably supported by a bearing;
 a compressor wheel integrated with said rotor shaft and forming a radial compressor section in cooperation with a first surrounding shroud to compress intake air;
 a combustion chamber for burning fuel with compressed air produced by said compressor section;
 a turbine wheel coupled to said rotor shaft and defining a turbine section in cooperation with a second surrounding shroud, said turbine section including an inlet end communicating with an outlet of said combustion chamber and an outlet for expelling combustion gas therefrom;
 a sensor for detecting a tip clearance between the compressor wheel and said first surrounding shroud;
 an actuator for selectively causing an axial displacement of said rotor shaft; and
 a controller operatively coupled to said sensor and said actuator for controlling said tip clearance by activating said actuator according to an output from said sensor;
 said sensor comprising a pair of first and second electrodes formed over a shroud part opposing blades of said compressor wheel, said controller having a first terminal operatively coupled to said end first electrode and a second terminal operatively coupled to said second electrode.

38. The gas turbine engine according to claim 37, wherein one of said electrodes comprises an annular part surrounding at least one other said electrodes.

39. The gas turbine engine according to claim 37 or claim 38, wherein said actuator comprises a piezo actuator.

40. The gas turbine engine according to claim 37 or claim 38, wherein a working end of said actuator engages said rotor shaft via a lever mechanism.

41. The gas turbine engine according to claim 37 or claim 38, wherein a working end of said actuator engages said rotor shaft via a rotational coupling.

42. The gas turbine engine according to claim 37 or claim 38, wherein a working end of said actuator engages said rotor shaft via a magnetic coupling.

43. The gas turbine engine according to claim 37 or claim 38, wherein said actuator comprises a flapper nozzle adapted to impinge an air flow onto an end of said rotor shaft.

44. The gas turbine engine according to claim 37 or claim 38, wherein said rotor shaft is integrated with said turbine wheel and said compressor wheel as a single-piece unit.

45. The gas turbine engine according to claim 44, wherein said single-piece unit is made of ceramic material.

46. The gas turbine engine according to claim 37 or claim 38, wherein said rotor shaft is integrated with said turbine wheel or said compressor wheel as a single-piece unit.

47. The gas turbine engine according to claim 37 or claim 38, wherein said controller is adapted to control said tip clearance according to a feedback mechanism.

48. The gas turbine engine with a tip clearance control according to claim 47, wherein said controller is adapted to control said tip clearance according to a prescribed schedule.

* * * * *